Patented Nov. 2, 1943

2,333,142

UNITED STATES PATENT OFFICE 2,333,142

WATER SOFTENING PROCESS

Abraham Sidney Behrman, Chicago, Ill., assignor to Infilco Incorporated, a corporation of Delaware No Drawing. Application September 18, 1940, Serial No. 357,286

5 Claims. (Cl. 210—24)

This invention relates to the treatment of aqueous liquids containing dissolved cations and has particular reference to an improved cation exchange material and to methods of manufacture and use of such material.

Heretofore several different materials have been suggested for cation exchange. As disclosed in British Patent No. 7,119 of 1902 to Halse, a cation exchange material is produced by treating substances such as sawdust and lignite with strong sulfuric acid. Coal is another substance which has been found of utility in cation exchange processes when the coal is sulfonated with strong acid.

A principal object of the present invention is to provide an improved type of cation exchange material which is desirable for use in the softening of water and for the bodily removal from water of bicarbonates and carbonates. The improved type of material is produced from rubber and rubber-like compounds.

A further object of the invention is the provision of a cation exchange material by the sulfonation of natural and synthetic rubber materials, and the use of such materials in cation exchange, accompanied by periodic regeneration of the material with a dilute solution of a compound of the cation it is desired to substitute in the liquid treated.

The class of rubber materials is quite well known and includes natural rubber products such as gum rubber and vulcanized rubber products of the soft and hard rubber types. Many synthetic products of this character also are known and reference may be made to U. S. Department of Commerce National Bureau of Standards Circular No. C427, entitled "Synthetic Rubbers, a Review of Their Compositions, Properties, and Uses," issued June 25, 1940, for further details concerning their nature. The particular results desired and the uses to which the cation exchange material is to be put will determine the desirability of any particular rubber compound in accordance with the present invention.

Natural rubber products at the present time are economically more available than the synthetic rubbers. Both the natural and synthetic rubbers principally are oxygen-free aliphatic hydrocarbons, the particular characteristics of which will depend upon such factors as the amount of sulfur, the extent of polymerization, and the extent of vulcanization or coagulation to which the material has been subjected. Rubbers consist of atomic chains of great length built up by thousands of repetitions of some unit configuration. While these giant molecules generally are formed by a polymerization in which double bonds attached to an end carbon atom open up to provide the necessary volume for polymerization, the molecule may, as in the case of organic polysulfides, be formed by condensation. It is possible that this extremely large molecular size accounts for the utility of my improved cation exchange material.

In preparing the material for use the rubber is comminuted to the desired particle size as an initial step. Thereafter the rubber is subjected to treatment with strong sulfuric acid such as fuming sulfuric acid or concentrated sulfuric acid. The amount of acid may vary quite widely, and the extent of sulfonation will depend upon such factors as time of treatment, temperature and amount of acid.

As an example of the operation of the process of producing the improved material, relatively finely divided particles of hard rubber turnings in the amount of about 60 grams were added to 150 milliliters of technical fuming sulfuric acid (20 per cent oleum), and allowed to stand. A spontaneous reaction begins within about 5 minutes and a temperature of about 130° to 150° C. is attained. Sulfur dioxide is evolved somewhat copiously during the sulfonation reaction. After completion of the reaction and cooling of the reaction mixture the material is washed with water.

Another method of sulfonating the rubber consists of adding 16 grams of the particles of hard rubber turnings to 400 milliliters of technical concentrated sulfuric acid (66° Baumé). This mixture is heated on a hot plate and when a temperature of about 140° to 150° C. is reached a vigorous reaction ensues with a rapid rise of temperature to around 190° to 210° C. Sulfur dioxide is evolved during the heating operation, which may last for approximately 2 hours. The resulting sulfonated particles are washed and dried.

The two procedures given in the above examples also may be employed in the treatment of synthetic rubber, pure coagulated latex and gum rubber.

After sulfonation of the rubber in the manner described it is in condition for hydrogen exchange. If it is desired to use the rubber material as some other cation exchanger, then the hydrogen exchange material resulting from the sulfonation is treated with a suitable solution of a salt having the cation which it is desired to impart to the sulfonated rubber. For example, if the rubber material is to be used as a sodium exchange medium, it is treated with a solution of a sodium salt such as sodium chloride, sodium bicarbonate or sodium carbonate after the sulfonation.

The materials prepared in the manner described and converted to a sodium exchange material by treatment with a sodium chloride solution were utilized as cation exchangers in the treatment of Chicago Lake Michigan water. Twenty-five milliliter beds of 24 to 30 mesh particle size were employed for the water treatment. Chicago lake water was passed through the beds until the effluent contained hardness in excess of 2 grains per gallon.

The hydrogen and sodium exchange capacities of the materials were as follows:

| Material | Capacity, grains per cubic foot | |
|---|---|---|
| | Na | H |
| Hard rubber (vulcanized) treated with fuming sulfuric acid (20 percent oleum) | 8,000 | 8,800 |
| Gum rubber (vulcanized) treated with fuming sulfuric acid (20 percent oleum) | 7,700 | 8,400 |
| Coagulated latex treated with fuming sulfuric acid (20 percent oleum) | 10,500 | 14,400 |
| Hard rubber treated with concentrated sulfuric acid (66° Baumé) | 5,000 | 5,700 |
| Gum rubber treated with concentrated sulfuric acid (66° Baumé) | 9,000 | 10,500 |
| Coagulated latex treated with concentrated sulfuric acid (66° Baumé) | 11,400 | 17,600 |

In general, these rubber materials have a higher hydrogen exchange value than sodium or other metal exchange value. It is characteristic that the materials may be regenerated many times without substantial loss of capacity. In regeneration substantially the same technique employed in regenerating other cation exchange materials may be employed. That is, if the material is being used as a hydrogen exchange agent and needs to be regenerated, it is washed with a dilute water solution of an acid.

In the treatment of flexible rubber in accordance with the present invention, it is generally true that the rubber undergoes a change in physical structure. For instance, in the production of one suitable composition synthetic neoprene rubber tubing may be cut into thin ringlets which may be treated with technical sulfuric acid (66° Baumé) in the amount of 400 milliliters per 50 grams of the rubber. The rubber and acid are heated to about 125° C. when the rubber begins to swell and there is an evolution of sulfur dioxide as well as an even greater evolution of sulfur trioxide. At about 140° C. a vigorous reaction occurs and the rubber begins to disintegrate from the ringlet form. The reaction may continue for about 1 hour at a temperature of 190° to 200° C. At the end of this time the particles have lost their original form and are no longer elastic. In fact, the rubber is in the form of rather firm, inelastic and black particles. When washed, dried, converted into a sodium exchange agent and tested in the manner described above the rubber material was found to have a capacity of about 9,500 grains per cubic foot. As a hydrogen exchange agent the sulfonated rubber has an exchange capacity of about 10,400 grains per cubic foot. Other forms of artificial rubber display corresponding properties. For instance, methyl and butyl rubbers may be treated in the same manner to produce similar results. As stated before, it apparently is the extremely large molecular size which is a common characteristic of all rubbers that makes this class of material of particular utility for the purpose described herein. For a summary of utilizable synthetic rubbers, reference may be made to table 1, page 4, of the aforesaid circular, and in general it may be stated that any of the large molecular compositions classed as rubber may be sulfonated as described herein and employed to advantage as a cation exchange material.

The many changes which may be made in the specific disclosure given herein for purposes of explanation which are possible without departing from the scope of the invention are intended to be included in the appended claims.

The term "rubber" is used in the specification and claims to designate both natural and synthetic rubber, unless the context clearly indicates to the contrary.

I claim:

1. The method of producing cation exchange, which comprises passing water containing dissolved cations from one material in contact with sulfonated rubber containing cations from another material.

2. The method of producing hydrogen exchange, which comprises passing water containing cations other than hydrogen in contact with sulfonated rubber having exchangeable hydrogen.

3. The process of treating water comprising contacting said water with a cation exchange material composed of a sulphonated rubber, and thereafter separating the water and said exchange material.

4. A process for treatment of water which comprises passing said water through a bed of water insoluble material produced by the reaction of strong sulphuric acid on a rubber product, the amount of acid, by weight, being greater than the amount of rubber.

5. The process of treating water which comprises passing the said water through a bed of water insoluble cation exchange material produced by the reaction resulting from subjecting rubber to heat in the presence of an amount of strong sulphuric acid greater than the weight of the original rubber product.

ABRAHAM SIDNEY BEHRMAN.